(12) United States Patent
Kaspersion (10) Patent No.: US 6,672,192 B2
(45) Date of Patent: Jan. 6, 2004

(54) METHOD OF CUTTING INSULATION FOR A PIPE ELBOW

(75) Inventor: Edward Kaspersion, Winnipeg (CA)

(73) Assignee: Kelkor Enterprises Ltd., Winnipeg (CA)

( * ) Notice: Subject to any disclaimer, the term of this patent is extended or adjusted under 35 U.S.C. 154(b) by 132 days.

(21) Appl. No.: 09/849,593

(22) Filed: May 7, 2001

(65) Prior Publication Data

US 2002/0162598 A1 Nov. 7, 2002

(51) Int. Cl.[7] ............................. B23D 3/02; B23D 57/00
(52) U.S. Cl. ............................... 83/607; 83/877; 29/557
(58) Field of Search .......................... 83/13, 582, 635, 83/761, 875, 876, 877, 878, 607; 138/149, 157; 29/527

(56) References Cited

U.S. PATENT DOCUMENTS

| | | | | |
|---|---|---|---|---|
| 2,841,193 A | * | 7/1958 | Petrosfsky | .................... 83/861 |
| 4,295,263 A | * | 10/1981 | Davis | .......................... 29/561 |
| 4,363,681 A | | 12/1982 | Williams | |
| 5,896,800 A | * | 4/1999 | Curtsinger et al. | ........... 83/835 |

* cited by examiner

Primary Examiner—Allan N. Shoap
Assistant Examiner—Ghassem Alie
(74) Attorney, Agent, or Firm—Adrian B. Battison; Michael R. Williams; Ryan W. Dupuis (57) ABSTRACT

An insulation piece for joining with a similar piece to surround a pipe elbow of a larger diameter such as greater than 9 inches outside diameter is formed by cutting from a block of the insulation material. This is effected by providing an outer and an inner arcuate blade portion each extending around an angle of greater than 180 degrees and mounted on a holder so as to rigidly carry the arcuate blade portions substantially in a common plane and centered about a common center; providing a table surface at right angles to the plane and containing the center; oscillating the holder and the arcuate blade portions thereon about an axis at right angles to the common plane and passing through the center such that the blade portions of the ring members are exposed above the table plane and reciprocate about the axis in a cutting action; and guiding the movement of the block in a part circular path about a guide axis at right angles to the table plane with the guide axis located so that the blade portions cut through the block each along a part circular line at a radius of curvature from the guide axis arranged to match a respective radius of curvature of the pipe elbow. The blades are each cut from a plate integrally with a holder portion to form a complete closed rigid body and have carbide tips mounted in notches in one edge so that the blades retain a circular shape during cutting.

6 Claims, 6 Drawing Sheets

METHOD OF CUTTING INSULATION FOR A PIPE ELBOW

The present invention relates to a method of cutting a block of insulation material to form an insulation piece for a pipe elbow.

BACKGROUND OF THE INVENTION

It is commonly required to insulate pipes both when the pipes are hotter than the environment and when the pipes are colder than the environment. Larger size pipes such as those having a diameter of the order of 3 inches or greater are usually insulated by attaching half cylindrical portions of solid insulation material which are engaged onto the pipe from opposite sides and which are joined at a central plane. It is also necessary to effect insulation of the pipe at elbows which may be 90° or 45° elbows. At the present time elbows are available but only fabricated from pieces of insulation material which are glued together to form the required structure. One example is shown in U.S. Pat. No. 4,363,681 (Williams) issued December 1982. This patent refers back to an ASTM publication "Prefabrication and Field Fabrication of Thermal Insulation Fitting Covers" Page 140–1969 which discloses a ten piece assembly in which the insulation pieces are manually cut, pitted and interconnected. This is of course a complex unskilled operation and is thus expensive.

Yet further the fabrication of the elbows from separate pieces requires that the elbows be joined by glue lines and these glue lines can fracture under the significant temperature changes involved and can act as a conduit for heat transfer thus interfering with the insulation effect.

Up till now, therefore, no insulation elbow has been available which is cut from a solid insulation material in an integral piece, particularly in larger diameters where the external diameter of the insulation piece at the elbow is of the order of 9 inches.

SUMMARY OF THE INVENTION

It is one object of the invention therefore to provide an improved method of forming an insulation piece for a pipe elbow and a piece so formed.

According to one aspect of the invention there is provided a method of forming an insulation piece for joining with a similar piece to surround a pipe elbow, the method comprising:

providing an outer arcuate blade portion extending around an angle of greater than 180 degrees and cut from a metal plate so as to define a depth between two edges of the blade portion equal to the plate thickness and a thickness between two side surfaces formed by two cut lines in the metal plate;

providing an inner arcuate blade portion extending around an angle of greater than 180 degrees and cut from a metal plate so as to define a depth between two edges of the blade portion equal to the plate thickness and a thickness between two side surfaces formed by two cut lines in the metal plate;

the outer arcuate blade portion having a diameter greater than the inner arcuate blade portion;

each of the arcuate blade portions being integrally formed with a holder portion cut from the plate which connects ends of the arcuate blade portion to maintain the blade portion rigid;

mounting the holder portions of both of the ring members on a holder so as to rigidly carry the arcuate blade portions substantially in a common plane and centered about a common center;

the holder being arranged to engage the holder portions of the ring members leaving an angle of the arcuate blade portions greater than 180 degrees exposed and open at a top portion thereof;

providing a table surface in a table plane at right angles to the plane and containing the center;

providing on one of the edges of each of the blade portions of the ring members a plurality of sharpened, hardened cutting teeth members;

oscillating the holder and the arcuate blade portions thereon about an axis at right angles to the common plane and passing through the center such that the blade portions of the ring members are exposed above the table plane and reciprocate about the axis in a cutting action;

locating a block of insulating material on the table so that one surface of the block moves across the table plane through the common cutting plane such that the outer blade portion cuts a generally circular outer surface of the insulation piece and the inner blade portion cuts a generally circular inner surface of the insulation piece;

and guiding the movement of the block in a part circular path about a guide axis at right angles to the table plane with the guide axis located so that the blade portions cut through the block each along a part circular line at a radius of curvature from the guide axis arranged to match a respective radius of curvature of the pipe elbow.

Preferably the cutting teeth members are carbide tips having a width greater than the thickness of the ring member.

In one possible arrangement, the holder portion of each arcuate blade portion is arcuate so as to define therewith an annular blade member and wherein the holder defines a pair of arcuate slots extending over an angle of at least 120 degrees each receiving and locating the arcuate holder portion of a respective one of the blade members. In this arrangement, the holder preferably comprises a back plate, and a pair of mounting plate portions mounted on the back plate and defining the slots therebetween. Yet further, the holder preferably includes a front clamping plate attached to the back plate and clamping the ring member therebetween.

In an alternative arrangement, the holder portion of each blade portion comprises a plate portion cut from the same plate in an integral structure with the blade portion but wider than the relatively thin blade portion so as to provide rigidity to the blade portion during cutting and arranged for clamping to a back plate of the holder.

In another alternative, the inner blade portion is cut from a thinner plate than the outer blade portion.

In a yet further alternative, the holder portion of each of the blade portions forms a common plate member for attachment to the holder.

Preferably the outer blade portion has a diameter greater than 9 inches and more preferably 12 inches.

The invention also provides as a second aspect an insulation piece for joining with a similar piece to surround a pipe elbow when formed by the method as defined above.

According to a third aspect of the invention there is provided an insulation piece for joining with a similar piece to surround a pipe elbow comprising:

a block of insulating material;

the block having a joining plane for attachment to the similar piece;

the block having an outer surface defining a circular arch relative to the joining plane and cut by an arcuate blade;

the block having an inner surface defining a circular arch relative to the joining plane and cut by an arcuate blade;

the outer and inner surfaces being curved about a common axis at right angles to the common plane arranged to match a respective radius of curvature of the pipe elbow;

the circular arch of the outer surface having a diameter greater than 9 inches.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
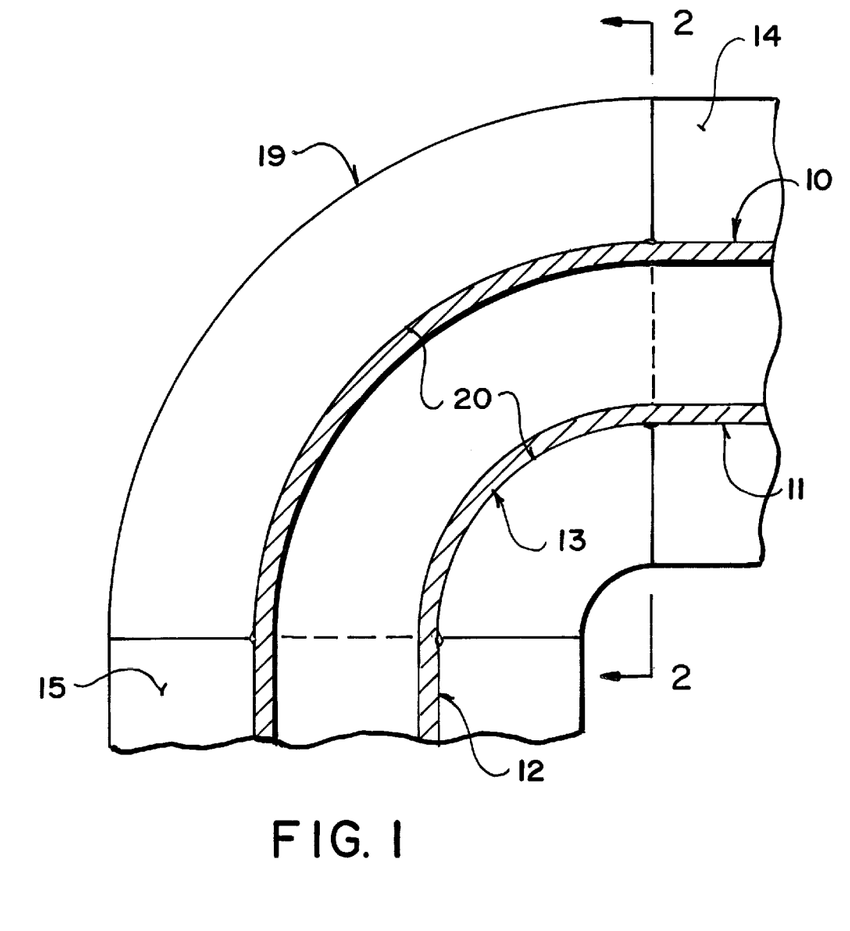
FIG. 1 is a side elevational view one piece of insulation material for connection to a second similar piece to surround a pipe elbow.
Figure 2:
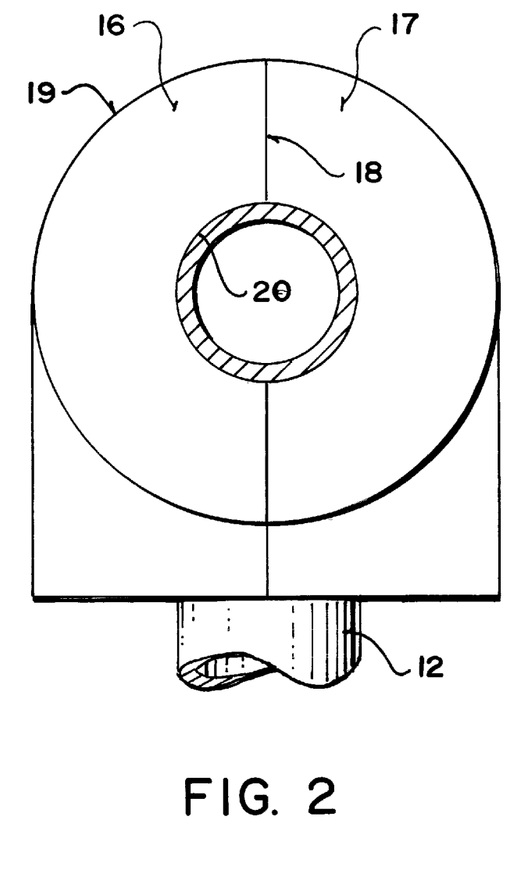
FIG. 2 is a vertical cross section along the lines 2—2 of FIG. 1 showing both pieces of the insulation material forming the complete insulation at the elbow.

In FIGS. 1 and 2 is shown a pipe 10 which has two straight sections 11 and 12 joined by an elbow 13. The pipes can be joined by welding or screw fittings as is well known and this connection is shown only schematically since it is not part of the present invention.

Each of the straight pipe pieces 11 and 12 is insulated by a conventional insulation piece 14, 15 generally formed in two halves which are attached around the exterior of the pipe.

The elbow 13 is covered by insulation material formed in two integral half sections 16 and 17. These two sections are joined along a central joining plane 18 and are connected by adhesive or by an external wrapping but holds the insulation pieces together on the exterior of the pipe.

Each insulation piece is symmetrical to the other and assuming that the pipe curvature is a constant curve, the two pieces are identical but reversed.

Each piece has an outer surface 19 and an inner surface 20. Both of these surfaces are defined by a half circle and also both of these surfaces curve about the same center of curvature as the pipe. Thus the inner surface arches over one half of the pipe and follows the curvature of the pipe. The outer surface 19 defines an outer surface of the insulation body and is spaced from the inner surface by a constant distance so that the thickness of the insulation material is constant through the elbow and through the pieces on the straight sections of the pipe.

Turning now to the method of manufacture, each of the two pieces which are connected together to cover the pipe elbow is manufactured separately from a block 30 of a suitable insulation material. Many different types of insulation material can be used including urethane foam and other materials which are normally difficult to cut such as mineral wool or rock wool, cellular foam glass, fibreglass, Styrofoam, polystyrene foam and composites thereof, and the present invention is particularly suitable for the materials which are more difficult to cut.

Figure 3:
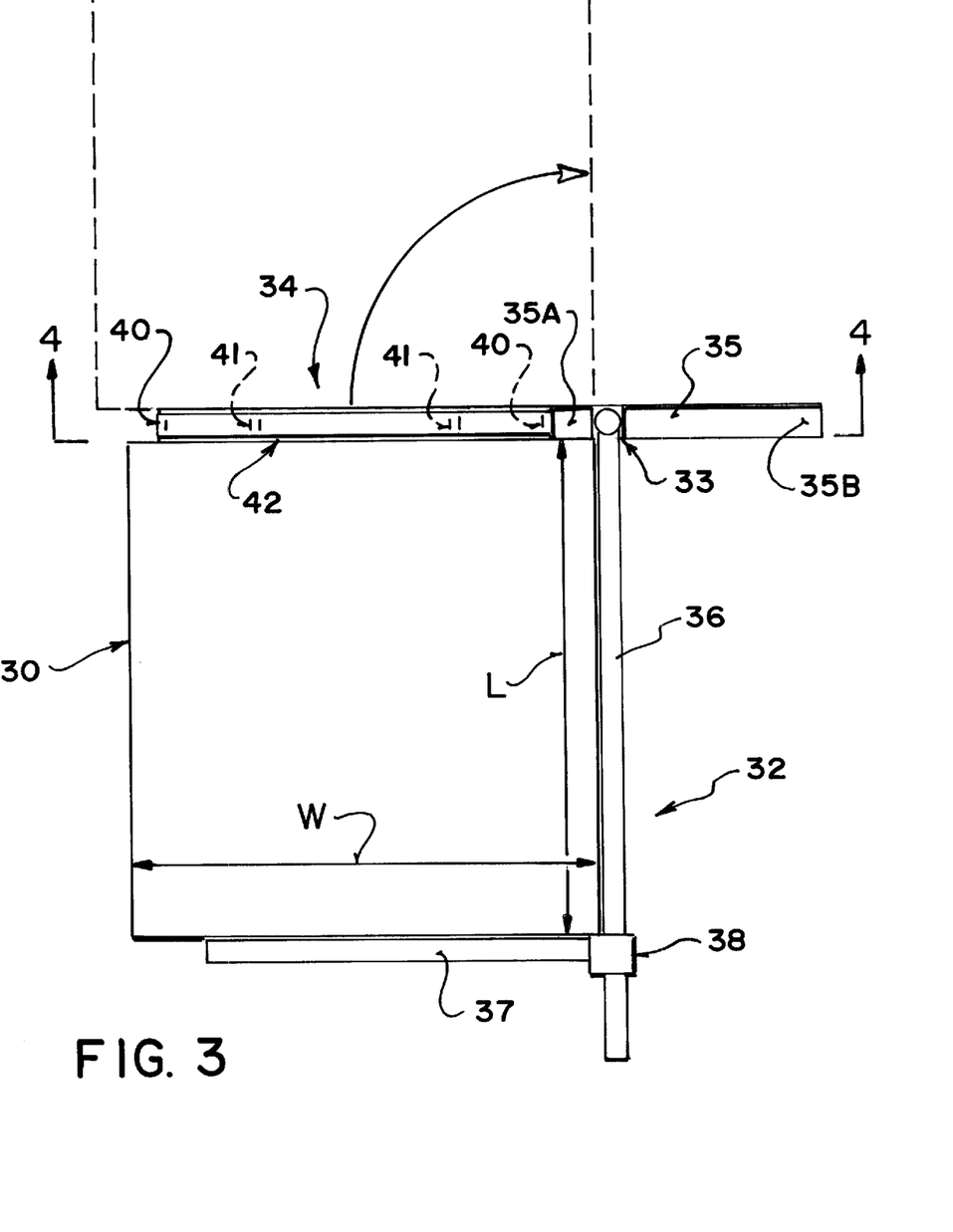
FIG. 3 is a top plan view of a machine for forming one piece for use in the insulation of FIGS. 1 and 2.
Figure 4:
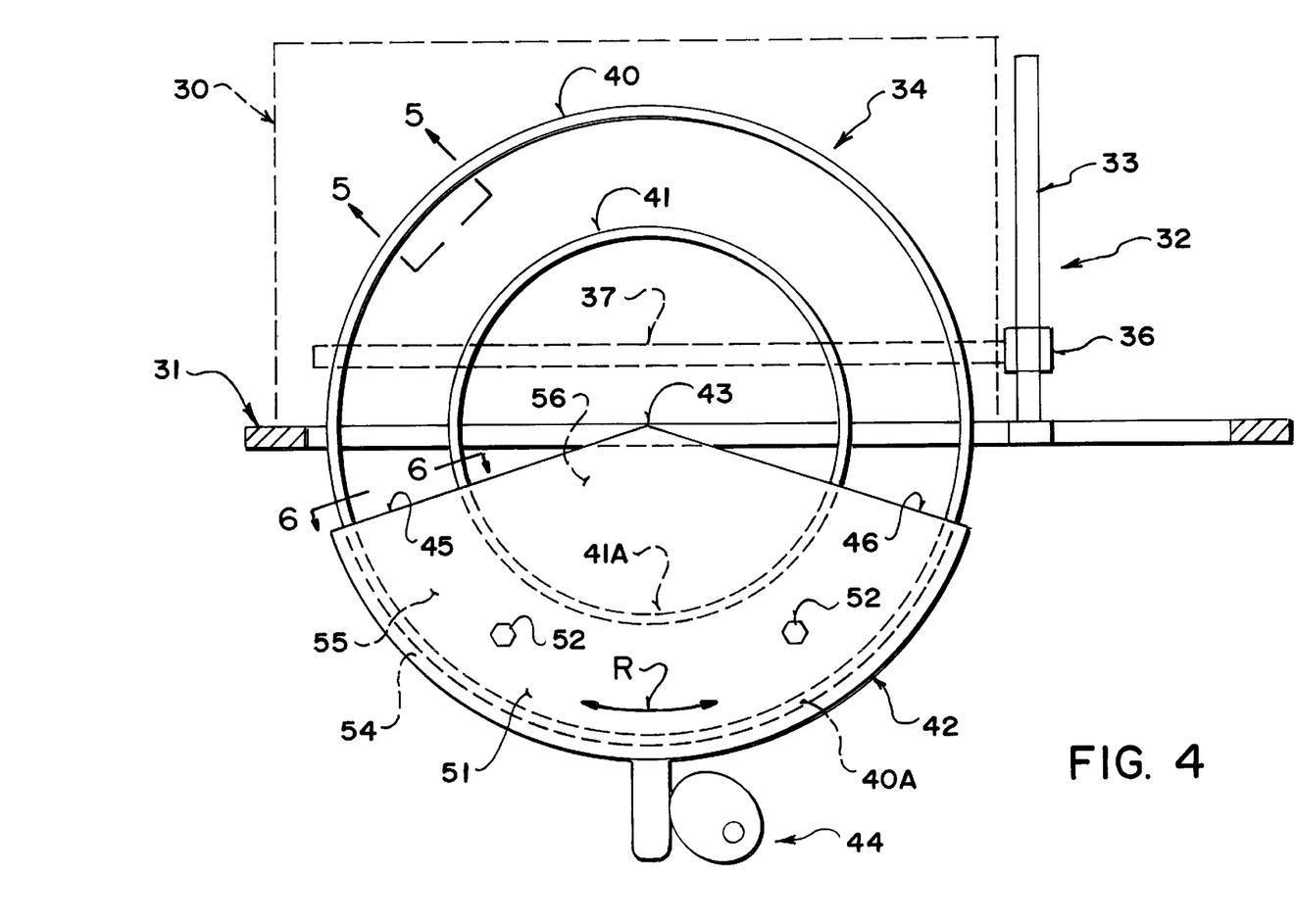
FIG. 4 is a view along the lines 4—4 of FIG. 3.

The block 30 is dimensioned so that it has a height from a table 31 which is at least half of the outside diameter of the piece. The block has a width W greater than the diameter of the outside surface. The block has a length L also greater than the diameter of the outside surface. The length L and the width W are also calculated relative to the curvature of the pipe elbow so that the block has sufficient material to allow cutting of the curvature without the outer blade, as explained hereinafter, extending beyond the outside surface of the block during the movement of the block through the cutting device.

The block is provided on the table 31 and is held in a guide system generally indicated at 32 which allows the block to sweep across the table surface in rotational movement about a vertical post 33 of the guide system. The guide system is located relative to a blade assembly 34 so as to carry the block through the blade assembly in the cutting action. The post 33 is adjustable along a guide 35 of the table so that it can move towards and away from the side of the blade 34 between ends 35A and 35B of the guide slot. This movement changes the location of the rotation axis of the block during the cutting action so as to change the radius of curvature of the piece to accommodate different curvatures of pipe elbow.

The guide assembly 32 further includes an arm 36 carried on the post and projecting away from the post and rotatable about the post. The arm 36 can be raised and lowered on the post. The arm is parallel to the table. A second arm 37 is mounted on the first arm and extends therefrom horizontally at right angles to the first arm so that the two arms can engage adjacent faces of the rectangular block. The position of the second arm 37 on the first arm 36 can be adjusted by slide mounting 38. This adjustment allows the guide mechanism to accommodate different size of block.

The blade assembly 34 includes an outer blade member 40 and an inner blade member 41 carried on a holder 42. The holder 42 is mounted on a support system under the table for reciprocating pivotal movement about a central axis 43 lying in the table and at right angles to the common plane of the blade assembly. The holder is driven in the reciprocating pivotal movement R by a cam and cam follower system generally indicated at 44. The details of the mounting arrangement and the drive cam arrangement are shown only schematically since these can be modified in accordance with engineering requirements and will be well known to one skilled in the art. The blades 40 and 41 thus include a blade portion which extends through an angle greater than 180° from a line 45 of the holder to a second line 46 of the holder so that the holder remains below the table surface during its reciprocating movement. Thus in the area above the table at all times is presented to the block the two arcuate blade portions for engaging and cutting the block of insulation material.

Figure 5:
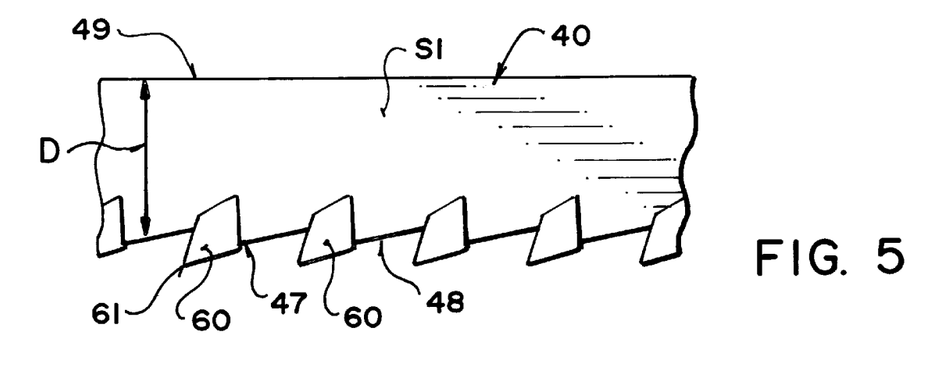
FIG. 5 is a view along the lines 5—5 of FIG. 4.

Each of the blade members is formed so that it completes a full periphery without any breaks in the material forming the blade member around the blade portion and within a holder portion engaging the holder. Each blade member is formed by cutting from a solid metal plate so that a holder portion and a blade portion are integrally formed from the same plate by a cutting action. Thus a depth of the blade indicated at D is equal to a thickness of the holder portion and both are equal to the thickness of the plate from which the integral body forming the blade portion and the holder portion are cut. Thus each side surface S1 and S2 is formed by cutting through the thickness of the plate. In practice a plate of a thickness of 0.5 to 1.5 inches may be suitable depending upon the diameter and generally a thickness of 1.0 inch has been found to be acceptable and a thickness of the blades in the range 0.1 to 0.2 inch and more preferably 0.125 inch is suitable to provide sufficient rigidity of the blade portions during the cutting action to maintain the require arcuate shape without distortion from the circle. This shape must be maintained without distortion while accommodating the forces of the cutting action.

The blade is completed by forming a plurality of notches 47 in a front edge 48 of the blade portion opposite a trailing edge 49 of the blade portion. In each notch is inserted a carbide tooth 60 of a conventional construction which has a leading cutting edge 61 to provide a cutting action. The carbide teeth have a width greater than the thickness of the blade portion so that the side edges 62 and 63 of the teeth are wider than and overhang the side surfaces S1 and S2. Thus the teeth groove in the insulation material and allow the blade portion which support the teeth to pass through that groove while accommodating the curvature necessary for the cutting action caused by the rotation of the block without jamming of the blade portion within the groove cut by the teeth.

The construction of the blade portions and their respective holder portions cut from a plate to form a rigid body completely surrounding the hollow interior of the blade portion provides sufficient rigidity for the blade portion to maintain the blade portion against distortion during the cutting action despite the sideways forces caused by the rotation of the block in the cutting action.

The specific construction of the blade portions and their holder portions can vary depending upon the selection of engineering construction deemed most suitable.

Figure 6:
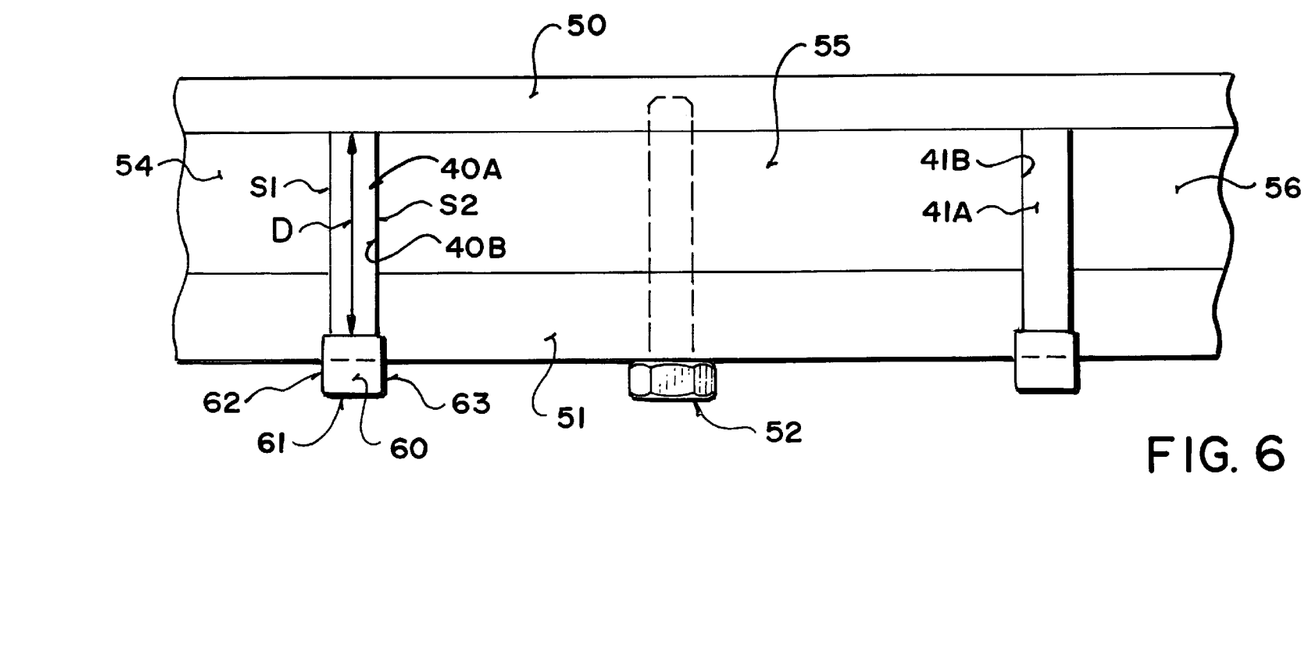
FIG. 6 is a view along the lines 6—6 of FIG. 4.

Thus in FIGS. 4 and 6 is shown one arrangement in which each blade portion is integrally formed with a holder portion which forms a similar narrow band indicated at 40A and 41A respectively. Each narrow band 40A, 41A is received within a groove formed in the holder so as to be clamped by the holder. Thus as shown in FIG. 6 the holder comprises a back plate 50 and a front plate 51 which are clamped together by screws 52. The grooves for the holder portions 40A and 41A are formed by insert pieces 54, 55 and 56 which are machined to provide side surfaces defining grooves 40B and 41B to receive the holder portions 40A and 41A respectively.

Figure 7:
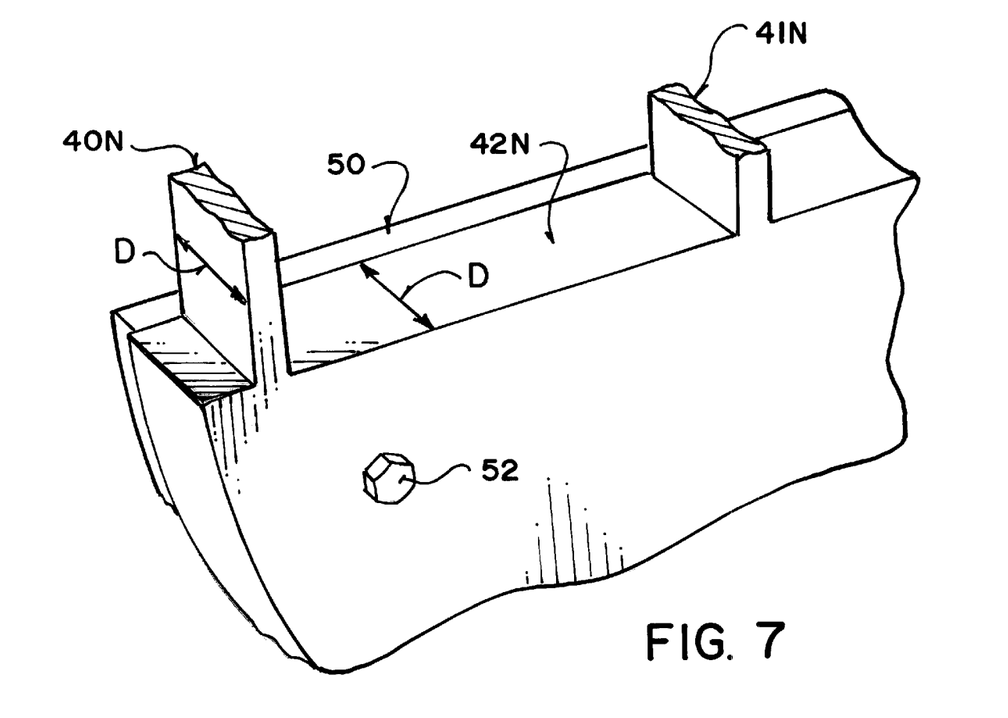
FIG. 7 is an isometric view of an alternative construction of the annular blade portions and holder portions of the machine of FIG. 3.

In an alternative arrangement shown in FIG. 7, both blade portions 40N and 41N are formed integrally with a generally D-shaped holder portion 42N by cutting the whole integral structure including both blade portions from a single plate. The holder portion 42N is then clamped to the back plate 50 by screws 52. Yet again the integral structure between the holder portion and the blade portions ensures that the blade portions are maintained without distortion during the cutting action.

A yet further arrangement can be provided in which the inner blade portion is formed as an annular ring with the holder portion also in the form of a ring and the outer blade portion can be formed with an integral holder portion which defines a groove for receiving the ring holder portion of the inner blade. In this arrangement the inner blade can be cut from a thinner plate and received against a backing face of the outer blade holder so that its front cutting edge is co-planar with the front cutting edge of the outer blade but its back face is faced forwardly from the back face of the outer blade. It will be appreciated that the inner blade being smaller has less distortion forces and therefore can be manufactured from thinner plate and possibly from a narrower band cut from the plate.

Figure 8:
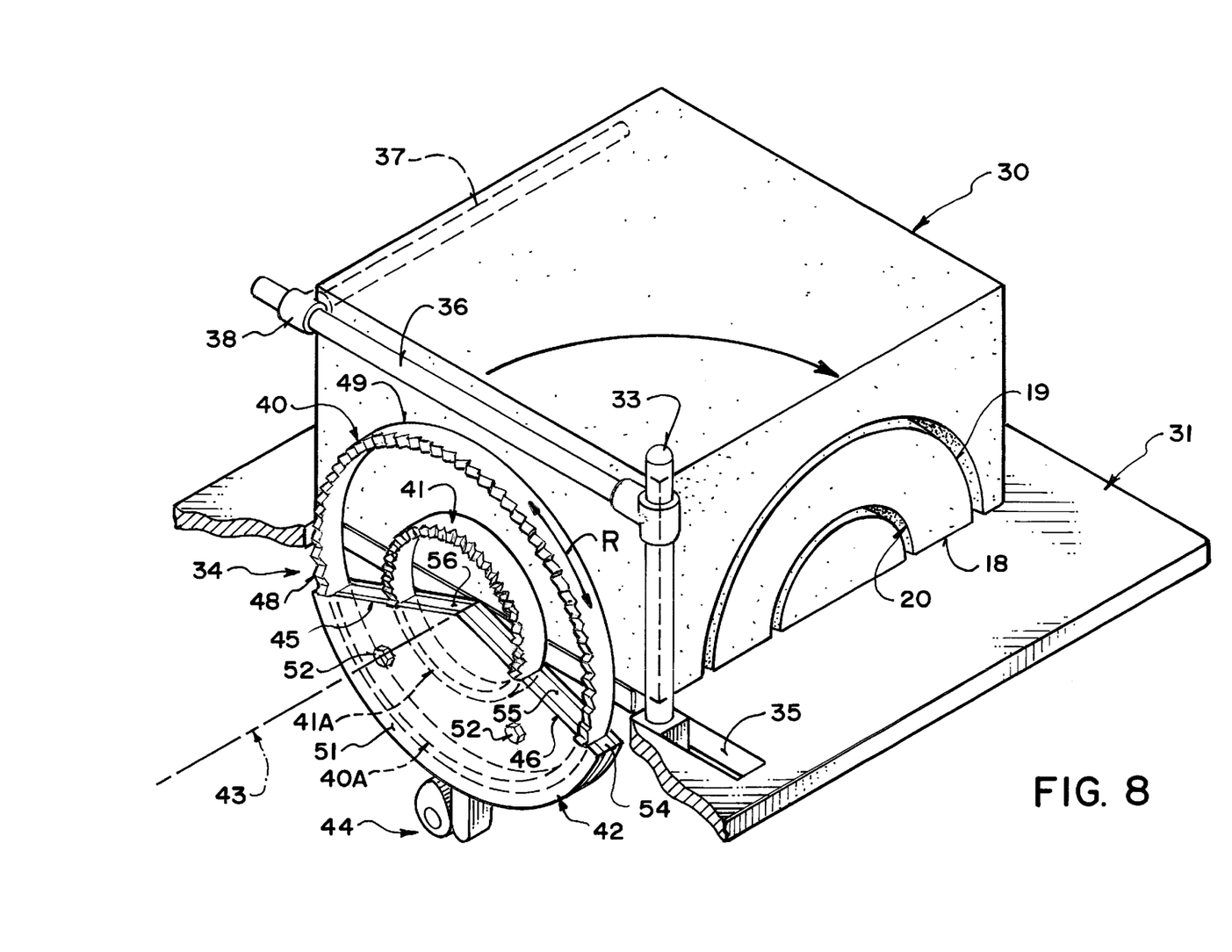
FIG. 8 is an isometric view of the method as according to the present invention.

In the cutting action, the guide system shown in FIG. 3 sweeps the block through the cutting blade assembly from the start position shown in complete line to the finish position shown in dash line thus forming two arched surfaces defining in the outer surface and the inner surface of the insulation piece with the required insulation piece being defined by the area between the two blade portions.

Each insulation piece is thus formed in turn by cutting an individual block and these can then be supplied to the required location for assembly simply by connecting the two pieces together at the elbow.

The portions which are not required from the block can be discarded or may be used for cutting other smaller insulation pieces depending upon the calculated sizes of the original block relative to the required piece cut from the block. It will be apparent to a person skilled in the art that careful attention can be given in this area to reducing the amount of waste material to the minimum by selecting the original size of the block to be cut relative to the pieces to be cut from that block.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of forming an insulation piece for joining with a similar piece to surround a pipe elbow, the method comprising:

providing an outer cylindrical blade member cut from a metal plate so as to define a cylindrical body having a depth between front and rear edges of the blade member equal to the plate thickness and a thickness between two side surfaces formed by two cut lines in the metal plate, the outer cylindrical blade member including an arcuate outer blade portion extending around an angle of greater than 180 degrees and an arcuate outer holder portion extending around an angle of less than 180 degrees;

providing an inner cylindrical blade member cut from a metal plate so as to define a cylindrical body having a depth between front and rear edges of the blade member equal to the plate thickness and a thickness between two side surfaces formed by two cut lines in the metal plate, the inner cylindrical blade member including an arcuate inner blade portion extending around an angle of greater than 180 degrees and an arcuate inner holder portion extending around an angle of less than 180 degrees;

the outer cylindrical blade member having a diameter greater than the inner cylindrical blade member;

mounting the inner holder portion and the outer holder portion on a holder so as to rigidly carry the inner and outer arcuate blade members substantially concentrically with a cutting edges thereof lying in a common cutting plane;

arranging the holder to engage the holder portions of the ring members leaving an angle of the arcuate blade portions greeter than 180 degrees exposed and open at a top portion thereof;

arranging the holder to include a back plate and a front plate between which the front and rear edges of the inner and outer blade members are clamped;

arranging the holder to include plate portions defining two arcuate slots within which the side edges of respective ones of the inner and outer blade members are received;

providing a table surface in a table plane at right angles to the plane and containing the center;

arranging the holder so as to be wholly below the table surface such that only the arcuate inner and outer blade portions are exposed above the table surface;

providing on the front edge of each of the inner and outer blade portions a plurality of sharpened, hardened cutting teeth members;

oscillating the holder and the arcuate inner and outer blade portions thereon about an axis at right angles to the common plane and passing through the center such that the inner and outer blade portions are exposed above the table plane and reciprocate about the axis in a cutting action;

locating a block of insulating material on the table so that one surface of the block moves across the table plane through the common cutting plane such that the outer blade portion cuts a generally circular outer surface of the insulation piece and the inner blade portion cuts a generally circular inner surface of the insulation piece;

and guiding the movement of the block in a part circular path about a guide axis at right angles to the table plane with the guide axis located so that the blade portions cut through the block each along a part circular line at a radius of curvature from the guide axis arranged to match a respective radius of curvature of the pipe elbow.

2. The method according to claim 1 wherein the outer blade portion a diameter greater than 9 inches.

3. The method according to claim 1, wherein the outer blade portion has a diameter greater than 12 inches.

4. A method of forming an insulation piece for joining with a similar piece to surround a pipe elbow, the method comprising:

providing an integral metal plate member;

providing a holder portion defined by a part of the integral metal plate member;

providing an outer arcuate blade portion cut from the metal plate member so as to define an outer arcuate body having a depth between front and rear edges of the outer blade portion equal to the plate thickness and a thickness between two side surfaces formed by two cut lines in the metal plate member, the outer cylindrical blade portion extending from the holder portion around an angle of greater than 180 degrees such that the holder portion extends around an angle of less than 180 degrees;

providing an inner arcuate blade portion cut from the metal plate member so as to define an inner arcuate body having a depth between front and rear edges of the inner blade portion equal to the plate thickness and a thickness between two side surfaces formed by two cut lines in the metal plate member, the inner cylindrical blade portion extending from the holder portion around an angle of greater than 180 degrees such that the holder portion extends around an angle of less than 180 degrees;

the outer cylindrical blade portion having a diameter greeter than the inner cylindrical blade portion;

arranging the inner and outer arcuate blade members substantially concentrically with cutting edges thereof lying in a common cutting plane;

arranging the holder portion to leave an angle of the arcuate blade portions greater than 180 degrees exposed and open at a top portion thereof;

providing a table surface in a table plane at right angles to the plane and containing the center;

arranging the holder portion so as to be wholly below the table surface such that only the arcuate inner and outer blade portions are exposed above the table surface;

providing on the front edge of each of the inner and outer blade portions a plurality of sharpened, hardened cutting teeth members;

oscillating the holder and the arcuate inner and outer blade portions thereon about an axis at right angles to the common plane and passing through the center such that the inner and outer blade portions are exposed above the table plane and reciprocate about the axis in a cutting action;

locating a block of insulating material on the table so that one surface of the block moves across the table plane through the common cutting plane such that the outer blade portion cuts a generally circular outer surface of the insulation piece and the inner blade portion cuts a generally circular inner surface of the insulation piece;

and guiding the movement of the block in a part circular path about a guide axis at right angles to the table plane with the guide axis located so that the blade portions cut through the block each along a part circular line at a radius of curvature from the guide axis arranged to match a respective radius of curvature of the pipe elbow.

5. The method according to claim 4 wherein the outer blade diameter greater than 9 inches.

6. The method according to claim 4 wherein the outer blade diameter greater than 12 inches.

* * * * *